(12) United States Patent
Hagerty

(10) Patent No.: US 7,529,304 B1
(45) Date of Patent: May 5, 2009

(54) WIRELESS SERIAL DATA TRANSMISSION METHOD AND APPARATUS

(75) Inventor: James D. Hagerty, Tiverton, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 750 days.

(21) Appl. No.: 11/086,737

(22) Filed: Mar. 21, 2005

(51) Int. Cl.
H04L 27/00 (2006.01)
(52) U.S. Cl. ..................................... 375/259
(58) Field of Classification Search ................. 375/259
See application file for complete search history.

(56) References Cited

U.S. PATENT DOCUMENTS

| | | | |
|---|---|---|---|
| 3,903,504 A | | 9/1975 | Rogers et al. |
| 4,405,944 A | * | 9/1983 | Eilers et al. .................. 348/485 |
| 4,458,268 A | * | 7/1984 | Ciciora ....................... 380/218 |
| 5,257,257 A | | 10/1993 | Chen et al. |
| 5,572,555 A | | 11/1996 | Soenen et al. |
| 5,914,947 A | * | 6/1999 | Saito ........................... 370/337 |
| 6,556,616 B2 | | 4/2003 | D'Amico |
| 7,130,284 B2 | * | 10/2006 | Lee et al. .................... 370/331 |

OTHER PUBLICATIONS

Analog Devices AD977 Datasheet "16-Bit, 100 kSPS/200 kSPS BiCMOS A/D Converter", 2000.*
Philips 87LPC764 Datasheet 87LPC762 "Low power, low price, low pin count (20 pin) microcontroller with 2 kbyte OTP", Oct. 26, 1999.*
Maxim MAX1472 Datasheet "300MHz-to-450MHz Low-Power, Crystal-Based ASK Transmitter", 2005.*
Analog Devices AD5542 Datasheet "5 V, Serial-Input Voltage-Output, 16-Bit DACs", 1999.*

* cited by examiner

Primary Examiner—Juan A Torres
(74) Attorney, Agent, or Firm—James M. Kasischke; Michael P. Stanley; Jean-Paul A. Nasser

(57) ABSTRACT

A data transmission system includes a serial A/D converter and a transmission processor. Transmission processor provides control signals to the A/D converter and first and second transmitters. The first transmitter is joined to the A/D converter to transmit a sync signal at a first frequency. The second transmitter is joined to transmit serial digitized data at a second frequency. First and second receivers are used to receive these frequencies. A reception processor is joined to the first receiver to activate a D/A converter on receipt of the sync signal. The D/A converter then converts digitized data received by the second receiver back to analog format. A method is also provided for transmitting and decoding the digital data.

6 Claims, 3 Drawing Sheets

WIRELESS SERIAL DATA TRANSMISSION METHOD AND APPARATUS

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with one related patent application Ser. No. 11/086,727, entitled "Radio Frequency Hydrophone System", now U.S. Pat. No. 7,177,232 B1 by the same inventor as this application.

BACKGROUND OF THE INVENTION (1) Field of the Invention

This invention relates to a method and apparatus for transmitting digital serial data. More specifically the invention relates to a method and apparatus for wirelessly transmitting digitized analog data and receiving and reconstructing the data on receipt.

(2) Description of the Prior Art

It is becoming more and more desirable to create wireless radio telemetry links to take advantage of modern advances in sensor technology. Putting the sensors in remote locations allows monitoring of data that was previously uncollectable. In such a situation it is mandatory to keep power consumption to an absolute minimum to allow for long battery life or even the possibility of wireless power transmission. In the latter, power transmission efficiencies tend to be low, mandating the very lowest power consumption for the sensor and its associated electronics. The associated electronics may include a preamplifier, analog-to-digital converter, microcontroller, and RF data transmitter.

FIG. 1A shows the timing of a typical analog-to-digital (A/D) converter, specifically the Analog Devices AD977. This device has a maximum rated sampling rate of 100 ksamples/sec. The sampling speed can be provided externally by an EXT CLK signal 6. With each sample, the device produces a 16-bit serial word. The device can also be programmed to produce a synchronization pulse as shown at 8 in the diagram at the beginning of each 16-bit data packet. This trace 8 is labeled "SYNC" in accordance with the other figures. The DATA OUT signal is shown as trace 10. In prior art systems, a composite waveform is produced from the last two traces 8 and 10 by connecting the separate inputs of an OR gate before modulating a transmitter.

One flexible way of generating the essential control signals to produce a synchronization pulse output is to use a microprocessor. The microprocessor may be a small, 8-bit unit such as the Philips 87LPC764. The start convert and data clock pulses (i.e., the first two A/D timing waveforms) may be generated by the microprocessor with only a few lines of assembly code. Then, the code may be "looped" back for another sampling interval.

The serial A/D output is then used to modulate a typical radio transmitter, such as the Maxim 1472, which will produce a composite, modulated signal centered around a carrier of 315, 433, or 915 MHz. These are popular license-free bands and are used only as examples. The MAX1472 is available as a 315 MHz or a 433 MHz unit and is a complete digital RF transmitter on a board that has only a 1 square inch footprint.

The major challenge occurs upon receiving the signal. FIG. 1B shows the timing diagram of a typical digital-to-analog converter (specifically, the AD5542 by Analog Devices). After the signal is received and demodulated, the received bitstream here called DATA IN 14 should be converted back into the desired original waveform in the D/A converter utilizing the clock signal CLK 16. The fundamental problem, however, is locating the beginning of the data packet because, as received, the ENABLE signal 18 is tied in with the DATA IN signal 14.

A known method of detecting the packet boundary is to send a sync or starting pulse which is much longer than one "high" data bit. A time interval measurement is then performed after detecting the positive-going edge of the sync pulse. A processor would perform these steps and send the result to the D/A converter. However, this is computationally slow and requires large blocks of memory. When a memory refresh in the detection processor is performed, a glitch or missing data point may occur in the detection. This method has the additional problem that a string of high data bits in the data packet could be mistaken for a start or a sync pulse. This potential problem would throw the detection hopelessly out of synchronization.

SUMMARY OF THE INVENTION

This invention provides a data transmission system which includes a serial A/D converter and a transmission processor. The transmission processor provides control signals to the A/D converter and first and second transmitters. The first transmitter is joined to the A/D converter to transmit a sync signal at a first frequency. The second transmitter is joined to transmit serial digitized data at a second frequency. First and second receivers are used to receive these frequencies. A reception processor is joined to the first receiver to activate a D/A converter on receipt of the sync signal. The D/A converter then converts digitized data received by the second receiver back to analog format. A method is also provided for transmitting and decoding the digital data.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

An effective solution to the above problems is to transmit the sync pulse at a different frequency than the rest of the data stream. Using this method, a sync or starting pulse will never be confused with a data pulse, and the receiver processor can then switch over to the data frequency and receive the data packet. A preferred apparatus 20 for transmitting a signal according to this method is provided in FIG. 2. A preferred apparatus for receiving and reconstructing the original analog signal is in FIG. 3.

Figure 1:
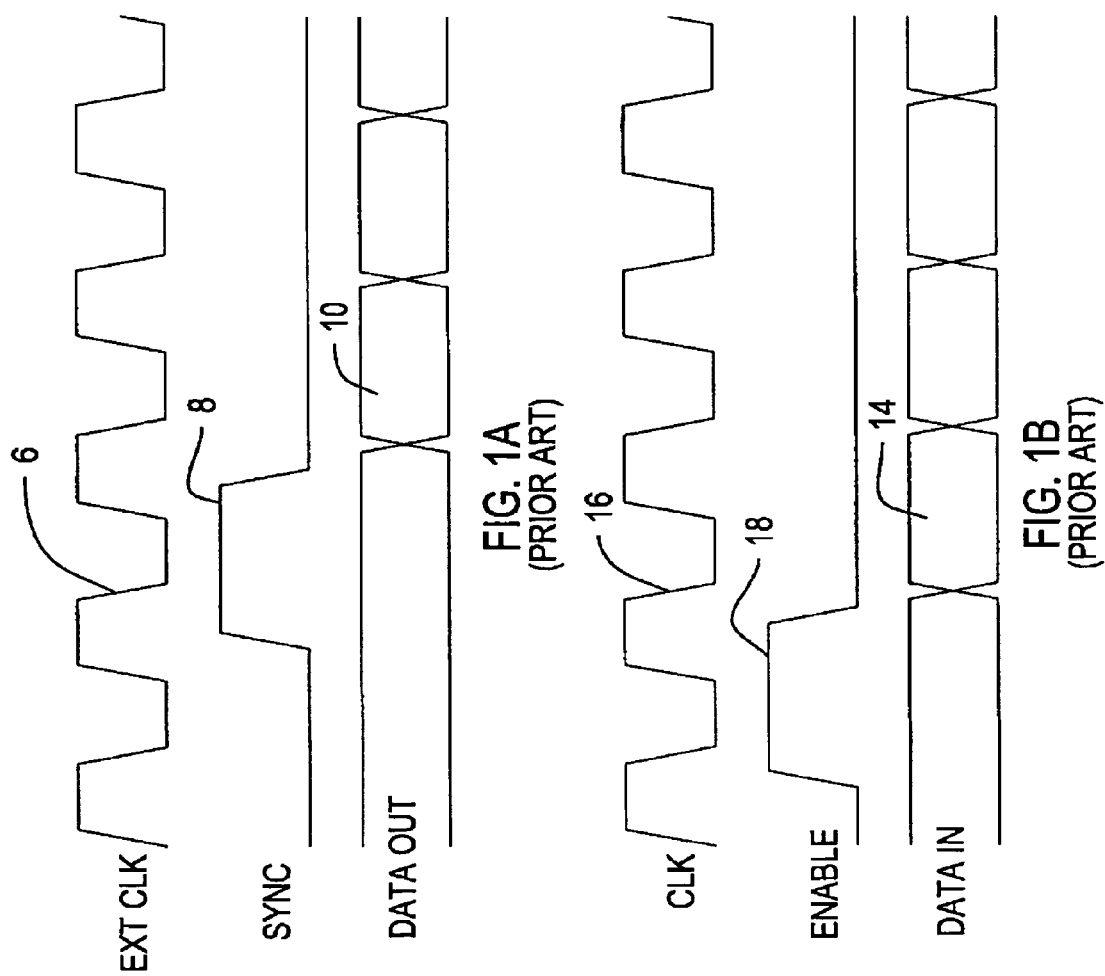
FIG. 1A is a timing diagram for a prior art A/D converter.
FIG. 1B is a timing diagram for a prior art D/A converter.
Figure 2:
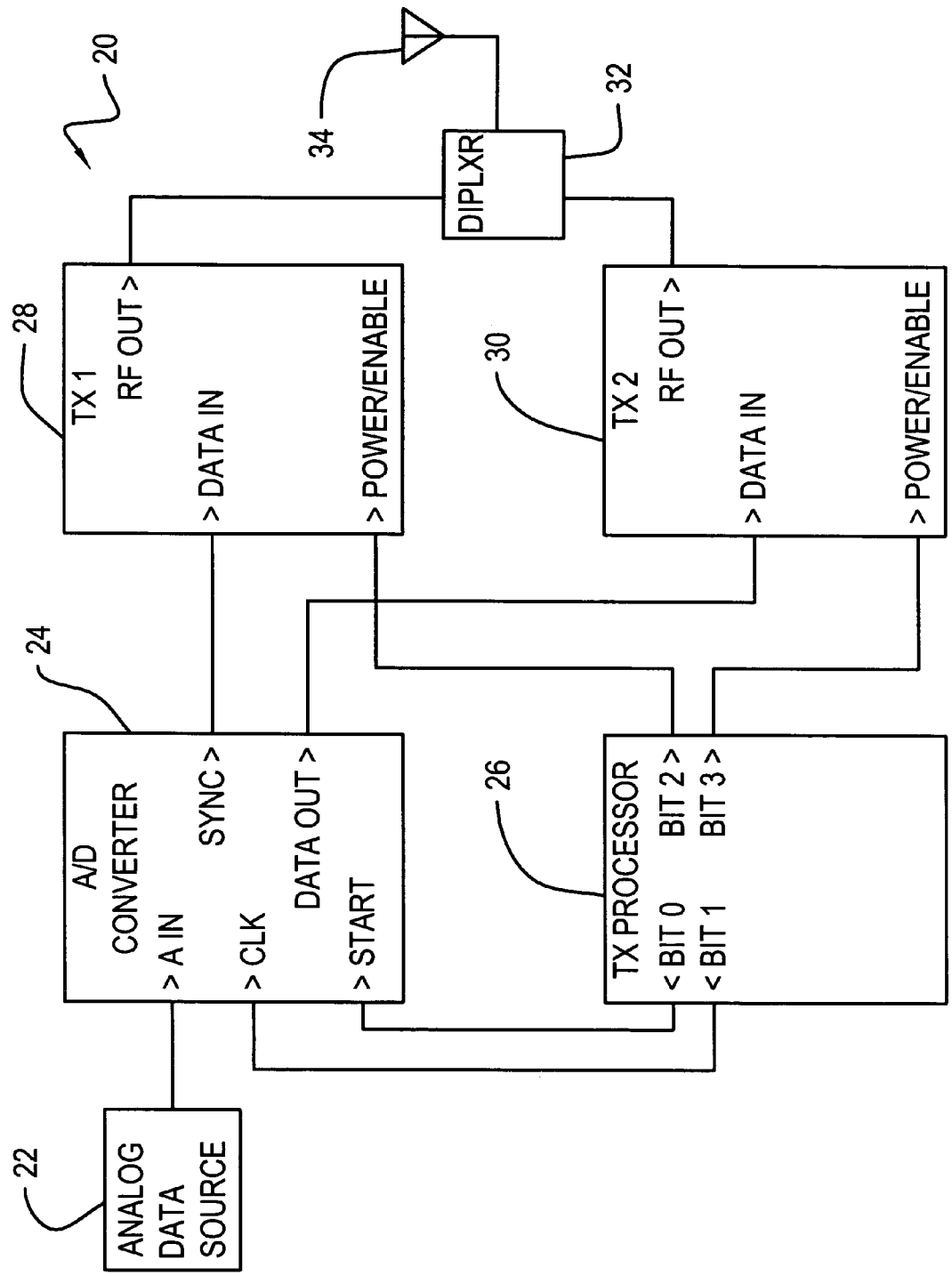
FIG. 2 is a diagram showing a circuit for transmission of data according to this invention.

Referring now to FIG. 2, there is shown the transmitter components of the invention including an analog data source 22 joined to an analog-to-digital (A/D) converter 24. A/D converter 24 can be any analog-to-digital converter such as the Analog Devices AD977 or the like. A/D converter 24 has an analog input marked A IN, a clock input marked CLK and an initialization input marked START. Additionally, A/D converter 24 has a sync pulse output marked SYNC and a digital data output marked DATA OUT. A/D converter 24 is joined to be controlled by a transmission (TX) processor 26.

Transmission processor 26 can be any processor capable of controlling A/D converter 24 and at least one transmitter. In a preferred embodiment, transmission processor 26 can be a microprocessor such as the Philips 87LPC764 which may be clocked up to 20 MHz allowing rapid switching. Processor 26 has ports marked BIT 0, BIT 1, BIT 2 and BIT 3. Processor 26 BIT 0 port is joined to the START input of A/D converter 24. Activation of BIT 0 port will cause A/D converter 24 to provide a sync pulse on its SYNC port. The Processor 26 BIT 1 port is joined to the clock input of the A/D converter 24 for clocking or strobing A/D converter 24 to sample data from analog data source 22.

A first transmitter 28 marked TX1 is provided to transmit a sync pulse on a first frequency at the RF OUT port. This transmitter 28 has a DATA IN port joined to the SYNC port of the A/D converter 24 and a POWER/ENABLE input joined to the BIT 2 port of TX processor 26. First transmitter 28 receives an activation signal from TX processor 26 on the POWER/ENABLE input.

A second transmitter 30 marked TX2 is provided to transmit serial data on a second frequency at a RF OUT port of the second transmitter. Second transmitter 30 has a DATA IN port joined to the DATA OUT port of the A/D converter 24 and a POWER/ENABLE input joined to the BIT 3 port of TX processor 26. Second transmitter 30 is activated by this joined BIT 3 port.

First and second transmitters 28 and 30 can be any transmitter such as the Maxim 1472 transmitter chip. Any modulation scheme can be used. For example, the Maxim 1472 transmitter chip can support PSK (phase-shift keying) and FSK (frequency-shift keying). The first and second frequencies can be selected from 315 MHz, 433 MHz and 915 MHz because these are popular license-free bands. Other frequencies can be used.

First and second transmitter RF OUT ports are joined to a diplexer 32 which is in turn joined to a transmitter antenna 34. Diplexer 32 resistively terminates energy at unwanted frequencies while passing energy at desired frequencies. Thus, it allows one antenna to be shared by two transmitters giving those transmitters and the antenna the proper impedance termination. Transmitter antenna 34 should have sufficient bandwidth to support both transmission frequencies. In the alternative, the diplexer can be omitted and separate transmitter antennas can be provided for each frequency.

At the transmission circuit 20, there are concerns about power consumption and complexity. Because the sync or start pulse is separate from the data stream, only one transmitter needs to be active at a given time. TX processor 26, which is necessary to clock A/D converter 24, may easily switch from one transmitter to the other utilizing BIT 2 and 3 when the sync pulse and then, subsequently, the data stream are sent out. By inactivating the unused transmitter, intermodulation products and undesired mixing between the two transmitters 28 and 30 will be avoided.

Figure 3:
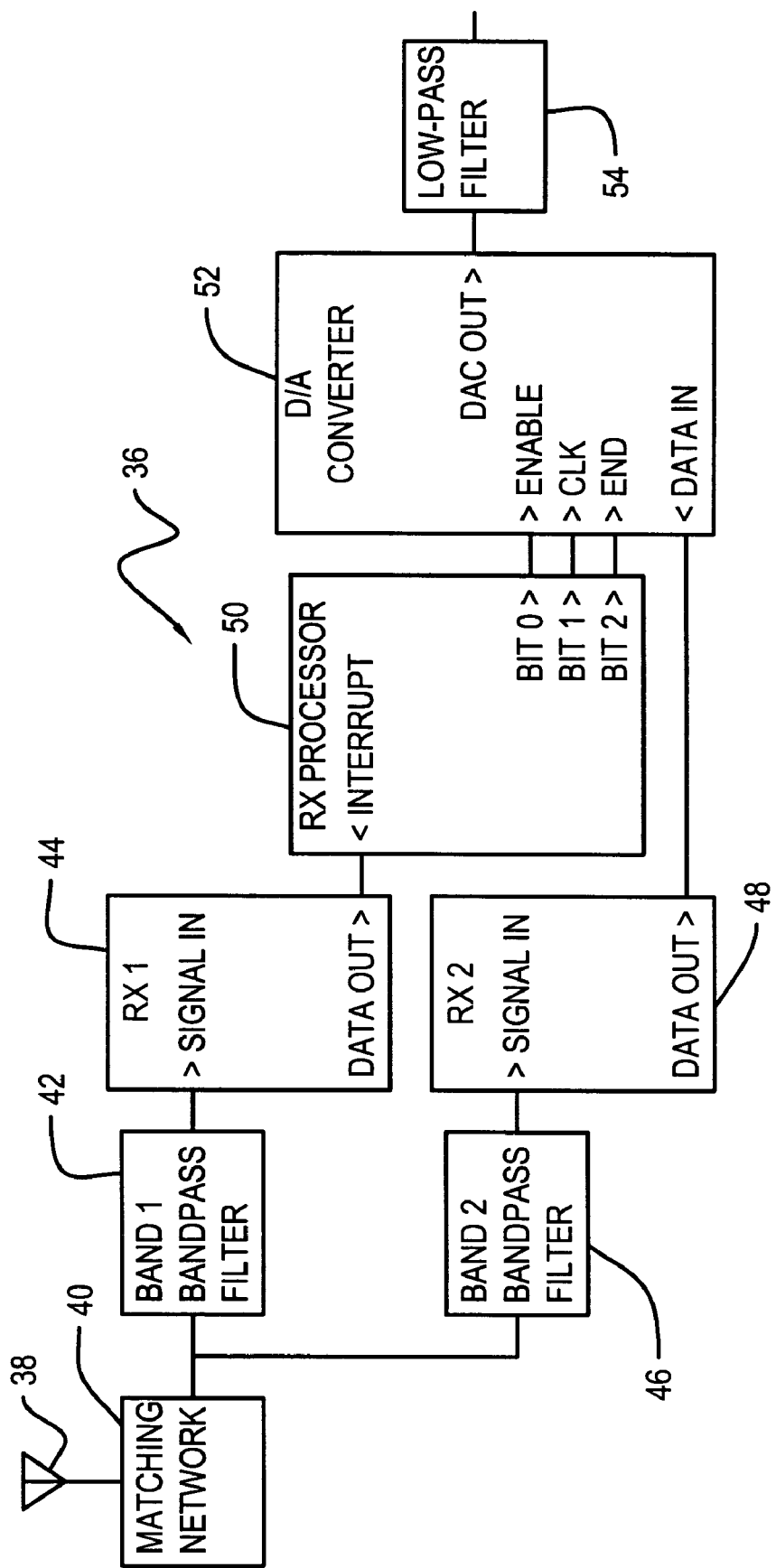
FIG. 3 is a diagram showing a circuit for receiving data according to this invention.

Referring now to FIG. 3, there is shown the receiving components of the invention. Receiving circuit 36 includes a receiving antenna 38. As above receiving antenna 38 should be dual-band or wideband in order to be capable of receiving both transmitted frequencies. The dual-band antenna can be implemented with traps (a built-in inductor/capacitor circuit which allows two-band resonance tuning). In the alternative separate receiving antennas could be provided for each frequency. These could be simple, one-band stub antennas. Receiving antenna 38 is joined to an impedance matching network 40 in order to provide efficient signal power transfer and to avoid intermodulation. Matching network 40 is joined to an optional first band pass filter 42 that allows passage of RF signals at the first frequency. First band pass filter 42 is in turn joined to a first receiver 44 marked RX1. First receiver 44 has a SIGNAL IN port for receiving the radio frequency signal at the first frequency. A DATA OUT port is provided on first receiver 44 for providing the demodulated signal received.

Matching network 40 is also joined to an optional second band pass filter 46 that allows passage of RF signals at the second frequency. Second band pass filter 46 is in turn joined to a second receiver 48 marked RX2. Second receiver 48 has a SIGNAL IN port and DATA OUT port. Radio frequency signals at the second frequency are received at the SIGNAL IN port, and the demodulated signal is provided at the DATA OUT port.

Optional first and second band pass filters 42 and 46 are preferred in a noisy environment. These filters may consist of simple, low-profile surface-mount parts. The group delay through both filters should be equalized in order to avoid adding a source of differential timing error between the sync channel and the data channel.

The first receiver 44 DATA OUT port is joined to an INTERRUPT port on a receiver (RX) processor 50. RX processor 50 has BIT 0, BIT 1 and BIT 2 ports for providing control signals to a digital-to-analog (D/A) converter 52. D/A converter 52 has an ENABLE port joined to RX Processor 50 BIT 0 Port, a CLK port joined to RX Processor 50 BIT 1 Port, and an END port joined to RX Processor 50 BIT 2 port. D/A converter 52 also has a DATA IN port joined to the second receiver 48 DATA OUT port for receiving the demodulated data signal. ENABLE port activates D/A converter 52 to indicate that a new data packet is arriving. The CLK port receives a clock signal from RX processor 50 to clock the received data. The RX processor 50 BIT 2 port provides an ending signal to the END port to indicate the end of the data packet. A DAC OUT port on the D/A converter 52 is provided to output the reconstructed analog signal. Low-pass filter 54 is joined to the DAC OUT port to remove undesired high frequency noise and to reconstruct the original sampled signal.

In operation, the sync pulse signal is received at antenna 38, and it passes through impedance matching network 40 and band pass filter 42 to first receiver 44. Receiver 44 provides the demodulated sync pulse to RX processor 50 INTERRUPT port. The RX processor 50 interrupt may be programmed to be edge-triggered for a rapid response. RX processor should have an interrupt service time that is at least an order of magnitude faster than the length of a data bit, or else it will not be able to transfer control from first receiver 44 to second receiver 48 in time to catch the beginning of the serial data. For instance, if a data bit is 20 microseconds long, a maximum interrupt response time of 1 microsecond is recommended. In accordance with these parameters, RX processor 50 can be a Philips 87LPC764 microprocessor which is clocked to allow sub-microsecond interrupt response times. Faster microcontrollers may be used if necessary.

After receiving the sync pulse, RX processor 50 enables the D/A converter 52, waits for a duration corresponding to the middle of the first data bit, and then generates the appropriate number of clock pulses to clock in the data that appears at the second receiver 48. A data stop pulse can be sent by RX processor 50 if necessary to indicate the end of the packet. The data stop pulse can be sent after the RX processor determines that sufficient clock pulses have elapsed to convert the data packet. In the alternative, the data stop pulse can originate at the A/D converter 24 as ordered by TX processor 26. The data stop pulse would follow the same path as the sync pulse. The RX Processor 50 then returns to polling the INTERRUPT port, and waits for the next sync or start pulse.

One source of timing ambiguity or jitter between the two channels could be multi-path distortion. In other words, if the first frequency signal took a different, reflected path than the second frequency signal then there could be multiple or delayed arrivals at the receive antenna 38. This can be minimized by using the lowest transmit power necessary to achieve a given signal-to-noise ratio or bit-error rate. Directional antennas in conjunction with minimum necessary transmit power will alleviate this effect. In one use, the propagation path is confined to a well-defined, narrow physical structure and may be tailored to avoid multi-path problems using the above techniques.

This invention represents an improvement over the prior art because it successfully removes the ambiguity in distinguishing the sync or start pulse from a string of high values in the data stream. The method has the further advantage in that it is adaptable to all modulation schemes while requiring only minimal extra hardware. No power dissipation penalty occurs at the transmit end because the transmitters are keyed separately and are never on at the same time. Utilizing this method, only a limited amount of data will be lost if a sync pulse is missed. Another independent chance to receive the data occurs at the beginning of the next packet, which tends to minimize the number of erroneous data points in the reproduced output waveform. (In other words, this method is self correcting from a synchronization standpoint.) Contrast this to previous detection methods where, if a sync pulse is mistaken for a group of data bits, a long string of received packets could be out of synchronization before the error is detected. This protocol has a low time and memory overhead because only one sync or start pulse is required in front of each data packet. However, the sync pulse may be made wider for more energy per bit if additional robustness is required.

This method is general to all serial communications systems which have data modulating a radio-frequency carrier. There are many alternatives in its implementation which involve tradeoffs in power dissipation (i.e., the use of faster microprocessors for interrupt handling), more complicated antenna coupling networks to accommodate the two frequencies (i.e., trap antennas and diplexers vs. separate antennas), and more hardware-intensive receivers which would be used for detecting modulation of greater complexity. For example, phase-shift keying (PSK) has been shown to have improved multi-path performance over simpler modulation methods and therefore would require a more complicated receiver for the sync and data channels.

The transmit and receive processors could be implemented as state generators which are driven by a high-speed square wave. The transmitter state generator is free-running and is clocked by the A/D sample clock or crystal oscillator. It produces the A/D control signals and all outputs shown in FIG. 2. The receiver state generator would produce the clock pulses needed to transfer the data into the D/A converter, plus any necessary control signals. Both state generators may be built using a digital counter and a PROM (programmable read-only memory). The square wave needed to drive the receiver state generator would be gated on by setting a flip-flop after a sync pulse is received. At the end of the D/A control sequence the flip-flop is reset and the logic is ready for another packet detection interval, which is initiated by a new (detected) sync pulse.

The apparatus cited in FIGS. 2 and 3 represent only one possible apparatus that can be used for providing and reconstructing a data stream by the inventive method, and this invention should not be limited by application to any specific apparatus.

What is claimed is:

1. A data transmission system comprising:
   a serial A/D converter having an analog input port, a sync port and a data out port whereby said sync port is capable of providing a sync signal, said serial A/D converter receiving analog data from a data source and providing serial digitized data;
   a transmission processor joined to control said serial A/D converter, said transmission processor providing a start command to cause said serial A/D converter to provide the sync signal;
   a first transmitter having a data in port joined to said serial A/D converter sync port to transmit any provided sync signal, said first transmitter further having an RF out port capable of transmitting radio signals at a first frequency;
   a second transmitter having a data in port joined said serial A/D converter data out port to transmit any provided digitized data, said second transmitter further having an RF out port capable of transmitting radio signals at a second frequency;
   a transmission antenna capable of transmitting radio signals at said first frequency and said second frequency joined to said first transmitter RF out port and said second transmitter RF out port;
   a reception antenna capable of receiving radio signals at said first frequency and said second frequency;
   a first receiver joined to said reception antenna and capable of receiving said first frequency signals and providing an output;
   a second receiver joined to said reception antenna and capable of receiving said second frequency signals and providing an output;
   a reception processor having an interrupt port joined to said first receiver output, said reception processor having output ports capable of providing commands on reception of a signal at the interrupt port; and
   a digital to analog converter having a data in port joined to said second receiver output, and further having input ports joined to said reception processor output ports for receiving commands from said reception processor, said digital to analog converter providing an analog signal at an analog out port representative of said digitized data received at said data in port.

2. The apparatus of claim 1 wherein:
   said transmission processor has a first enable output port and a second enable output port, said transmission processor providing a signal to a selected one of said first and second enable output ports to select one of said first and second transmitters;
   said first transmitter has a enable port joined to said transmission processor first enable output port for activating said first transmitter; and said second transmitter has a enable port joined to said transmission processor second enable output port for activating said second transmitter.

3. The apparatus of claim 1 wherein:

said transmission processor has a clock output port capable of providing a clock output; and said serial A/D converter has a clock input joined to said transmission processor clock output port for receiving a clock signal.

4. The apparatus of claim 1 further comprising a diplexer joined between said first and second transmitters and said transmitting antenna.

5. The apparatus of claim 1 further comprising:

a first band pass filter joined between said receiving antenna and said first receiver, said first band pass filter allowing passage of said first frequency radio signal; and a second band pass filter joined between said receiving antenna and said second receiver, said second band pass filter allowing passage of said second frequency radio signal.

6. The apparatus of claim 5 further comprising an impedance matching network joined between said receiving antenna and said first and second band pass filters.

* * * * *